(12) United States Patent
Huang

(10) Patent No.: US 11,907,591 B1
(45) Date of Patent: Feb. 20, 2024

(54) METHOD AND SYSTEM FOR STORAGE MANAGEMENT, STORAGE MEDIUM AND DEVICE

(71) Applicant: INSPUR SUZHOU INTELLIGENT TECHNOLOGY CO., LTD., Jiangsu (CN)

(72) Inventor: Zheng Huang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/259,923

(22) PCT Filed: Oct. 29, 2021

(86) PCT No.: PCT/CN2021/127409
§ 371 (c)(1),
(2) Date: Jun. 29, 2023

(87) PCT Pub. No.: WO2022/257338
PCT Pub. Date: Dec. 15, 2022

(30) Foreign Application Priority Data

Jun. 10, 2021 (CN) .......................... 202110646466.9

(51) Int. Cl.
*G06F 3/06* (2006.01)
(52) U.S. Cl.
CPC ............ *G06F 3/067* (2013.01); *G06F 3/0613* (2013.01); *G06F 3/0644* (2013.01)
(58) Field of Classification Search
CPC ....... G06F 3/067; G06F 3/0613; G06F 3/0644
See application file for complete search history.

(56) References Cited

U.S. PATENT DOCUMENTS

| 6,378,039 B1 * | 4/2002 | Obara | G06F 3/0601 |
| | | | 711/114 |
| 10,620,868 B1 * | 4/2020 | Akaike | G06F 3/0665 |

(Continued)

FOREIGN PATENT DOCUMENTS

| CN | 104050115 A | 9/2014 |
| CN | 108153622 A | 6/2018 |

(Continued)

OTHER PUBLICATIONS

International Search Report and Written Opinion for PCT/CN2021/127409 (dated Feb. 28, 2022).

(Continued)

*Primary Examiner* — Ryan Bertram
(74) *Attorney, Agent, or Firm* — Merchant & Gould P.C.

(57) ABSTRACT

The present disclosure provides a method and system for storage management, a storage medium and a device. The method includes: making hard disks in a storage pool network with several controllers via network hard disk enclosures, respectively sending hard disk information to proxy drivers which are pre-configured in the controllers, and selecting one of the controllers as a main controller; respectively sending, the hard disk information to cluster drivers which are pre-configured in respective controllers; acquiring the hard disk information from each cluster driver via the main controller, and sending the total hard disk information sent to each cluster driver; acquiring information of a logical unit space corresponding to the request, and allocating an idle hard disk in the storage pool for the logical unit space according to the total hard disk information; processing, the read/write request in parallel in the idle hard disk.

20 Claims, 3 Drawing Sheets

(56) References Cited

U.S. PATENT DOCUMENTS

2007/0233868 A1    10/2007  Tyrrell et al.
2019/0294339 A1*    9/2019  Bolkhovitin .......... G06F 3/0607
2023/0053071 A1*    2/2023  Desanti .................. G06F 3/061

FOREIGN PATENT DOCUMENTS

| CN | 109271096 A | 1/2019 |
| CN | 111857572 A | 10/2020 |
| CN | 111857577 A | 10/2020 |
| CN | 113259474 A | 8/2021 |

OTHER PUBLICATIONS

Search Report for Chinese Patent Application No. 2021106464669 (dated Aug. 13, 2021).
Search Report for Chinese Patent Application No. 2021106464669 (dated Sep. 10, 2021).

* cited by examiner

METHOD AND SYSTEM FOR STORAGE MANAGEMENT, STORAGE MEDIUM AND DEVICE

CROSS-REFERENCE TO RELATED APPLICATION

The present application is a National Stage Application of PCT/CN2021/127409, filed on Oct. 29, 2021, which claims priority to Chinese Patent Application No. 202110646466.9, filed to the China National Intellectual Property Administration on Jun. 10, 2021 and entitled "Method and System for Storage Management, Storage Medium and Device", which is incorporated herein by reference in its entirety.

TECHNICAL FIELD

The present disclosure relates to the technical field of storage, and in particular, relates to a method and system for storage management, a storage medium and a device.

BACKGROUND

A hard disk is a storage device commonly used in a storage system; currently, for a server or a computer with a bulk-capacity storage requirement, a hard disk enclosure integrating a plurality of hard disks is often used as a main data storage apparatus. Most of the current hard disk enclosures are SAS hard disk enclosures (i.e. hard disk enclosures using hard disk serial transmission interfaces) and NVME hard disk enclosures based on JBOF interfaces (interfaces of NVME expansion cards). A hard disk enclosure can only be directly connected to or cascaded with a controller; even in current cluster systems, hard disk enclosures of a plurality of control nodes also use a manner of direct connection or cascade connection. Specifically, direct connection means that a hard disk enclosure is directly connected to a single controller; and regarding cascade connection, assuming that a control enclosure is cascaded with three hard disk enclosures numbered 1, 2 and 3, a cascade port on a controller A is connected to a PRI cascade port on a cascade component A of No. 1 hard disk enclosure, an EXP cascade port on the cascade component A of the No. 1 hard disk enclosure is then connected to a PRI cascade port on a cascade component A of No. 2 hard disk enclosure, and an EXP cascade port on the cascade component A of the No. 2 hard disk enclosure is connected to a PRI port on a cascade component A of No. 3 hard disk enclosure.

By the current direct connection or cascade connection manner between a hard disk enclosure and a controller, a large-scale storage structure cannot be formed, and thus the scale of data storage is limited, and it is difficult to satisfy the ever-increasing bulk-capacity storage requirement.

SUMMARY

In view of this, an object of some embodiments of the present disclosure is to propose a method and system for storage management, a storage medium and a device.

Some embodiments of the present disclosure provide a method for storage management, including:
hard disks in a storage pool are made network with several controllers via network hard disk enclosures, hard disk information is respectively sent to proxy drivers which are pre-configured in the controllers via the network hard disk enclosures, and one of the controllers is selected as a main controller;
the hard disk information is respectively sent by the proxy drivers to cluster drivers which are pre-configured in respective controllers;
the hard disk information is acquired from the cluster drivers via the main controller so as to generate total hard disk information, and the total hard disk information is sent to respective cluster drivers;
in response to receiving a request to allocate storage space, information of a logical unit space corresponding to the request is acquired, and an idle hard disk in the storage pool is allocated for the logical unit space according to the total hard disk information; and
in response to initiating a read/write request on a basis of the logical unit space, the read/write request is processed in parallel in the idle hard disk by corresponding controllers on a basis of the total hard disk information.

In some embodiments, the hard disk information is respectively sent to the proxy drivers which are pre-configured in the controllers via the network hard disk enclosures, includes: physical information of the hard disks and path information of connection between the hard disks and the controllers are respectively sent to the proxy drivers which are pre-configured in the controllers by the network hard disk enclosures.

In some embodiments, the hard disk information is acquired from the cluster drivers via the main controller so as to generate the total hard disk information, and the total hard disk information is sent to the respective cluster drivers, includes: the path information respectively received by other cluster drivers is aggregated by the cluster driver of the main controller; and aggregated total path information is respectively sent to the other cluster drivers, so that each of the cluster drivers has the total hard disk information constituted by the total path information and the physical information.

In some embodiments, one of the controllers is selected as the main controller, includes: a vector regarding respective IP address and ID number is respectively allocated to each of the controllers, and the controller with a smallest ID number is selected as the main controller.

In some embodiments, in response to receiving the request to allocate the storage space, the information of the logical unit space corresponding to the request is acquired, and the idle hard disk in the storage pool is allocated for the logical unit space according to the total hard disk information, includes: in response to receiving the request to allocate the storage space, the information of the logical unit space corresponding to the request is acquired, and other cluster drivers are informed of the information of the logical unit space by the cluster driver of the main controller; and on a basis of the logical unit space, the storage pool is requested to allocate a space, and the idle hard disk in the storage pool is queried on a basis of physical information in the total hard disk information and the idle hard disk is allocated to the logical unit space.

In some embodiments, the method further includes: a mapping table of correlation between stripe blocks of the hard disks and the controllers is established.

In some embodiments, in response to initiating the read/write request on the basis of the logical unit space, the read/write request is processed in parallel in the idle hard disk by the corresponding controllers on the basis of the total hard disk information, includes: in response to initiating the read/write request on the basis of the logical unit space, a part of the logical unit space corresponding to the read/write request is sliced into several logical blocks in units of stripe blocks by the main controller; the several logical blocks are made to sequentially correspond to the stripe blocks having a preset sequence in the idle hard disk, and several corresponding controllers are found from the mapping table on a basis of corresponding stripe blocks; and the read/write request is processed in parallel by the corresponding several controllers in the corresponding stripe blocks.

Another aspect of some embodiments of the present disclosure further provides a system for storage management, including:

a main controller selection component, configured to make hard disks in a storage pool network with several controllers via network hard disk enclosures, respectively send hard disk information to proxy drivers which are pre-configured in the controllers via the network hard disk enclosures, and select one of the controllers as a main controller;

a hard disk information sending component, configured to respectively send, by the proxy drivers, the hard disk information to cluster drivers which are pre-configured in respective controllers;

a total hard disk information component, configured to acquire the hard disk information from the cluster drivers via the main controller so as to generate total hard disk information, and send the total hard disk information to respective cluster drivers;

an idle hard disk allocation component, configured to in response to receiving a request to allocate storage space, acquire information of a logical unit space corresponding to the request, and allocate an idle hard disk in the storage pool for the logical unit space according to the total hard disk information; and a parallel processing component, configured to in response to initiating a read/write request on a basis of the logical unit space, process, by corresponding controllers, the read/write request in parallel in the idle hard disk on a basis of the total hard disk information.

Another aspect of some embodiments of the present disclosure further provides a computer-readable storage medium, storing computer program instructions that, when executed, implement the method according to any one above.

Still another aspect of some embodiments of the present disclosure further provide a computer device, including a memory and a processor, and the memory stores a computer program that, when executed by the processor, implements the method according to any one above.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

DETAILED DESCRIPTION OF THE EMBODIMENTS

To make the objects, technical solutions, and advantages of some embodiments of the present disclosure clearer, hereinafter, embodiments of the present disclosure are further described in detail in combination with specific embodiments and with reference to the accompanying drawings.

It should be noted that in the embodiments of the present disclosure, all expressions using "first" and "second" are used to distinguish two different entities having the same name or different parameters. Hence, "first" and "second" are only used for convenience of expression, and should not be understood as limitations to embodiments of the present disclosure. In addition, the terms "include" and "have", and any variations thereof are intended to cover a non-exclusive inclusion, for example, other steps or units inherent to a process, method, system, product, or device that includes a series of steps or units.

Figure 1:
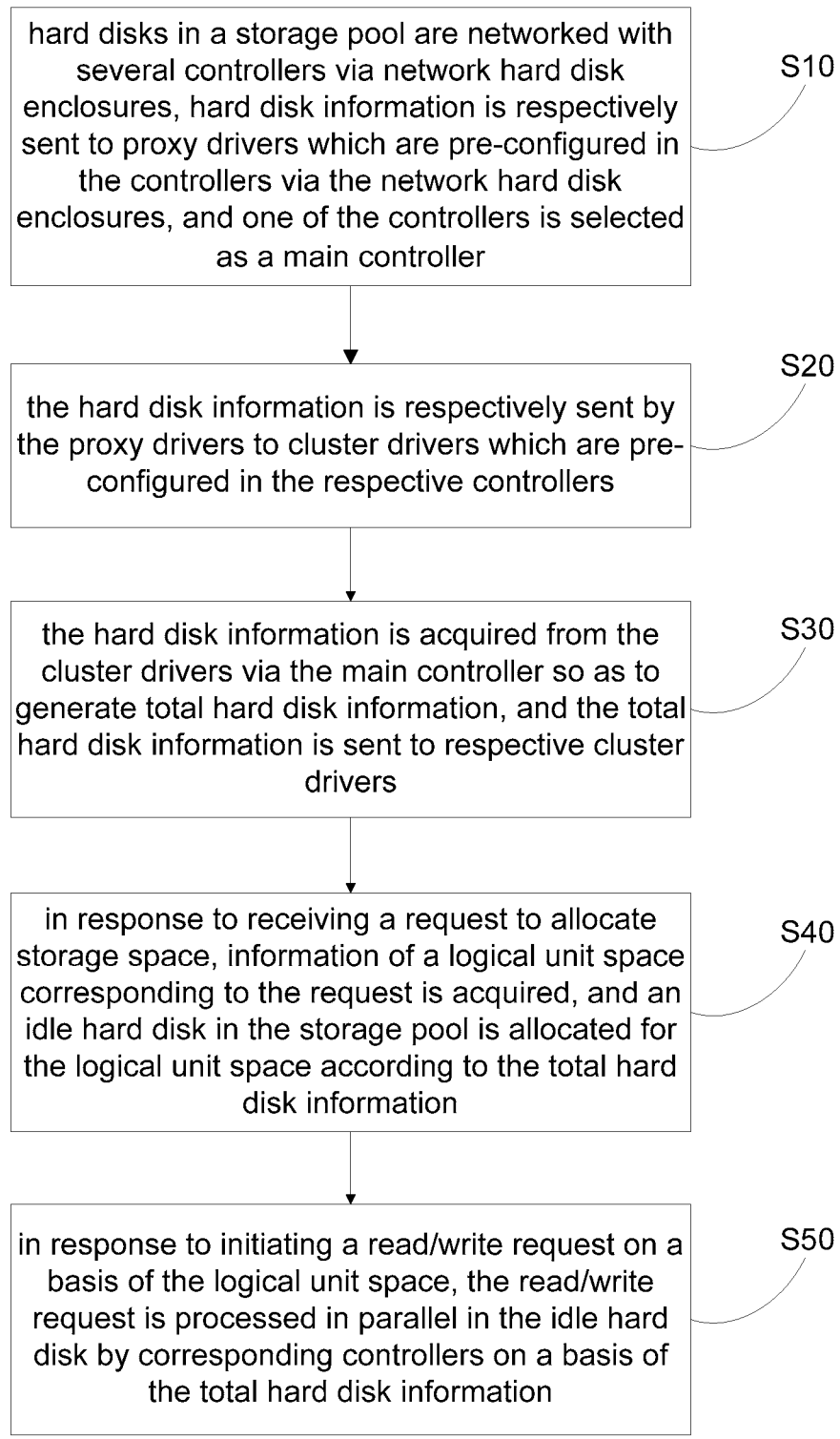
FIG. 1 is a schematic diagram of a method for storage management provided according to embodiments of the present disclosure.

On the basis of the object, a first aspect of embodiments of the present disclosure provides embodiments of a method for storage management. FIG. 1 shows a schematic diagram of an embodiment of a method for storage management provided according to some embodiments of the present disclosure. As shown in FIG. 1, the embodiment of the present disclosure includes the following steps:

step S10, hard disks in a storage pool are networked with several controllers via network hard disk enclosures, hard disk information is respectively sent to proxy drivers which are pre-configured in the controllers via the network hard disk enclosures, and one of the controllers is selected as a main controller;

step S20, the hard disk information is respectively sent by the proxy drivers to cluster drivers which are pre-configured in the respective controllers;

step S30, the hard disk information is acquired from the cluster drivers via the main controller so as to generate total hard disk information, and the total hard disk information is sent to respective cluster drivers;

step S40, in response to receiving a request to allocate storage space, information of a logical unit space corresponding to the request is acquired, and an idle hard disk in the storage pool is allocated for the logical unit space according to the total hard disk information; and step S50, in response to initiating a read/write request on a basis of the logical unit space, the read/write request is processed in parallel in the idle hard disk by corresponding controllers on a basis of the total hard disk information.

Figure 2:
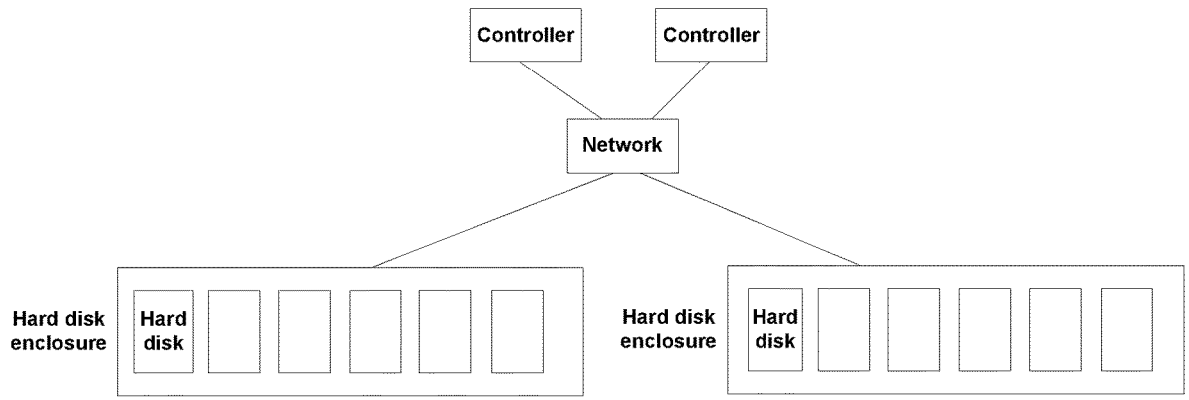
FIG. 2 is a schematic diagram of networking logic of controllers and network hard disk enclosures provided according to embodiments of the present disclosure.

FIG. 2 shows a schematic diagram of networking logic of controllers and network hard disk enclosures. As shown in FIG. 2, hard disks are located in hard disk enclosures and are connected to the hard disk enclosures; the hard disk enclosures use network interfaces, and controllers and the hard disk enclosures are connected via a network and interacts with each other by an NVME over TCP/RDMA protocol. NVME refers to a PCIE-based non-volatile memory express protocol; and RDMA refers to Remote DMA. The controller and all the network hard disk enclosures are intercommunicated and interconnected, and the controller can access the hard disks on all the hard disk enclosures. The controllers and the hard disks in the network hard disk enclosures can constitute a large-scale storage system, which has stronger expandability compared with the existing manner in which hard disk enclosures are directly connected to or cascaded with controllers. The proxy drivers which are pre-configured and cluster drivers are software programs.

In the embodiments of the present disclosure, by networking the controllers with the hard disk enclosures to make the controllers connected to the hard disks via a network, the controllers timely acquire relevant information of the hard disks; by providing the proxy drivers and the cluster drivers, the acquired hard disk information can be synchronized in the controllers, so that the controllers can timely learn an update state of the hard disks; by the logical unit space and finding an idle hard disk according to the hard disk information, the idle hard disk can be provided for a subsequent read/write request; and by a plurality of controllers to process the read/write request in parallel, the flexibility of the data read/write request for storage space requirements is improved, and the data read/write efficiency is increased.

In some embodiments, the hard disk information is respectively sent to the proxy drivers which are pre-configured in the controllers via the network hard disk enclosures, includes: physical information of the hard disks and path information of connection between the hard disks and the controllers are respectively sent to the proxy drivers which are pre-configured in the controllers by the network hard disk enclosures. In this embodiment, the proxy drivers communicate with the hard disks in the network hard disk enclosures by an nvme of protocol. The nvme of protocol is a novel protocol, and may be used in a storage network. The physical information of the hard disk includes a serial number, a manufacturer, a firmware version, and hard disk capacity, etc. of the hard disk. The path information includes an IP address of a controller connected to the hard disk, and an IP address of a network hard disk enclosure connected to the hard disk, etc.

In some embodiments, the hard disk information is acquired from the cluster drivers via the main controller so as to generate the total hard disk information, and the total hard disk information is sent to the respective cluster drivers, includes: the path information respectively received by other cluster drivers is aggregated by the cluster driver of the main controller; and aggregated total path information is respectively sent to the other cluster drivers, so that each of the cluster drivers has the total hard disk information constituted by the total path information and the physical information.

In this embodiment, in the controllers, the relevant information of the hard disks needs to be kept consistent. Specifically, the cluster drivers of other controllers send respective path information to the cluster driver of the main controller; then the cluster driver of the main controller aggregates information of its own path information and the path information of the other controllers, and then sends the aggregated total path information to the cluster drivers of the other controllers; and at this time, each controller has the total path information and the physical information, and the total path information and the physical information together form the total hard disk information. Further, when there is a controller of which the path information changes, the cluster driver of the controller updates the path information, and sends the updated path information to the cluster driver of the main controller, and then the cluster driver of the main controller updates the total path information and sends same to the cluster drivers of the other controllers. If the physical information of a hard disk changes, for example, the storage capacity thereof changes, as the hard disk is connected to all controllers, the proxy drivers of all controllers will also update the physical information in time, so that the physical information of the controllers remains synchronous.

In some embodiments, one of the controllers is selected as the main controller, includes: a vector regarding respective IP address and ID number is respectively allocated to each of the controllers, and the controller with a smallest ID number is selected as the main controller.

In this embodiment, a vector of (IP, ID) is allocated for each of the controllers, the IP denotes an IP address, i.e. an Internet Protocol address; and the ID denotes an ID number, i.e. a uniquely identified identification number. In this embodiment, a controller with the smallest ID number among the controllers is selected as the main controller, but is not limited thereto; and the controller with a greatest ID number among the controllers may also be selected as the main controller, or the main controller may be selected according to other preset rules in actual situations.

In some embodiments, in response to receiving the request to allocate the storage space, the information of the logical unit space corresponding to the request is acquired, and the idle hard disk in the storage pool is allocated for the logical unit space according to the total hard disk information, includes: in response to receiving the request to allocate the storage space, the information of the logical unit space corresponding to the request is acquired, and other cluster drivers are informed of the information of the logical unit space by the cluster driver of the main controller; and on a basis of the logical unit space, the storage pool is requested to allocate a space, and the idle hard disk in the storage pool is queried on a basis of the physical information in the total hard disk information and the idle hard disk is allocated to the logical unit space.

In some embodiments, the method further includes: a mapping table of correlation between stripe blocks of the hard disks and the controllers is established.

In some embodiments, in response to initiating the read/write request on the basis of the logical unit space, the read/write request is processed in parallel in the idle hard disk by the corresponding controllers on the basis of the total hard disk information, includes: in response to initiating the read/write request on the basis of the logical unit space, a part of the logical unit space corresponding to the read/write request is sliced into several logical blocks in units of stripe blocks by the main controller; the several logical blocks are made to sequentially correspond to the stripe blocks having a preset sequence in the idle hard disk, and several corresponding controllers are found from the mapping table on a basis of corresponding stripe blocks; and the read/write request is processed in parallel by the corresponding several controllers in the corresponding stripe blocks.

Figure 3:
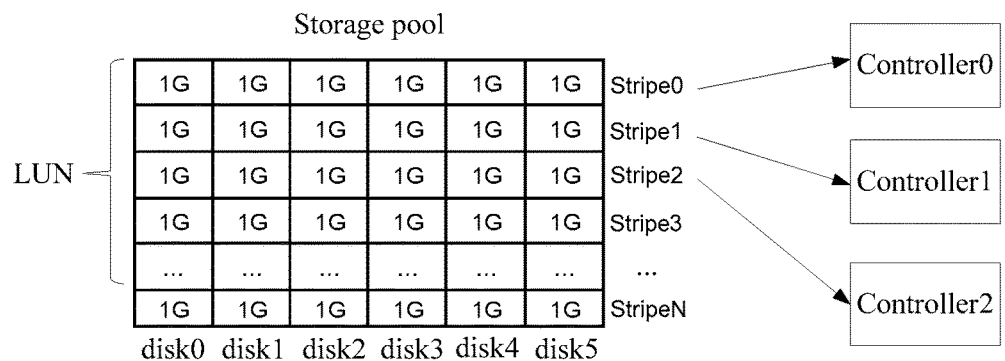
FIG. 3 is a schematic diagram of a mapping table between stripe blocks of hard disks in a storage pool and controllers provided according to embodiments of the present disclosure.

FIG. 3 is a schematic diagram of a mapping table between stripe blocks of hard disks in a storage pool and controllers. As shown in FIG. 3, the storage pool is a storage space constituted by several hard disks (disk0-disk5); the hard disks constituting the storage pool may be on one network hard disk enclosure, and may also be distributed in different network hard disk enclosures. When a request to allocate a storage space is received, a logical unit space (LUN) is created, and the cluster driver of the main controller notifies other cluster drivers of a message of LUN; then, an idle hard disk is found from the storage pool according to size of the logical unit space, and since the physical information of the hard disks will be updated when the capacity of the hard disks changes, the cluster driver can know which hard disks are idle according to the physical information of the hard disks, and then allocate the idle hard disk to the LUN according to sequence of the hard disks.

In order to achieve parallel processing of the read/write request of the LUN and increase the data read/write efficiency and improve service throughput, each of the hard disks is sliced into a plurality of stripe blocks. As shown in FIG. 3, each of the hard disks is sliced into units of 1G size, and each of the plurality of the stripe blocks are distributed on different stripes. Each of the stripes is formed by combining stripe blocks of a plurality of the hard disks. The stripes are made to correspond to different controllers in advance to form a mapping table. The read/write request of stripe 0 is on controller 0, the read/write request of stripe 1 is on controller 1, and so on. The LUN space is allocated in sequence in the storage pool according to the idle hard disk, for example, if a 100G LUN needs to be created, and the LUN space corresponds to 100 stripe blocks (i.e. 100 G space) of hard disk 0 (disk0) in the storage pool, then the LUN space is distributed on stripes 0 to 99. If the LUN needs to write a request of 10 G size, the write request is split into 10 stripe blocks, corresponding to stripe 0 to stripe 9, then the write requests of stripe 0 to stripe 9 will be respectively executed by different controllers; in this way, the controllers can execute the read/write request of the LUN in parallel, thereby increasing the IO (data input/output) throughput.

Figure 4:
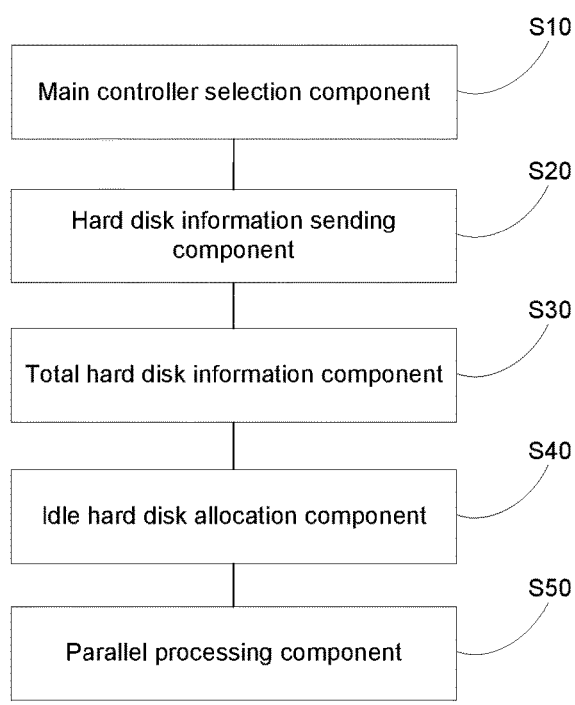
FIG. 4 is a schematic diagram of a system for storage management provided according to embodiments of the present disclosure.

A second aspect of the embodiments of the present disclosure also provides a system for storage management. FIG. 4 shows a schematic diagram of an embodiment of a system for storage management provided according to some embodiments of the present disclosure. As shown in FIG. 4, the system for storage management according to embodiments of the present disclosure includes: a main controller selection component 10, configured to make hard disks in a storage pool networked with several controllers via network hard disk enclosures, respectively send hard disk information to proxy drivers which are pre-configured in the controllers via the network hard disk enclosures, and select one of the controllers as a main controller; a hard disk information sending component 20, configured to respectively send, by the proxy drivers, the hard disk information to cluster drivers which are pre-configured in respective controllers; a total hard disk information component 30, configured to acquire the hard disk information from the cluster drivers via the main controller so as to generate total hard disk information, and send the total hard disk information to respective cluster drivers; an idle hard disk allocation component 40, configured to in response to receiving a request to allocate storage space, acquire information of a logical unit space corresponding to the request, and allocate an idle hard disk in the storage pool for the logical unit space according to the total hard disk information; and a parallel processing component 50, configured to in response to initiating a read/write request on a basis of the logical unit space, process the read/write request in parallel in the idle hard disk by corresponding controllers on a basis of the total hard disk information.

In the system for storage management of the embodiments of the present disclosure, the controllers and all the network hard disk enclosures are intercommunicated and interconnected, and the controllers can access the hard disks on all the hard disk enclosures. The controllers and the hard disks in the network hard disk enclosures can constitute a large-scale storage system, which has stronger expandability compared with the existing manner in which hard disk enclosures are directly connected to or cascaded with controllers. By networking the controllers with the hard disk enclosures to make the controllers connected to the hard disks via a network, the controllers timely acquire relevant information of the hard disks; by providing the proxy drivers and the cluster drivers, the acquired hard disk information can be synchronized in the controllers, so that the controllers can timely learn an update state of the hard disks; by the logical unit space and finding an idle hard disk according to the hard disk information, the idle hard disk can be provided for a subsequent read/write request; and by a plurality of controllers to process the read/write request in parallel, the flexibility of the data read/write request for storage space requirements is improved, and the data read/write efficiency is increased.

Figure 5:
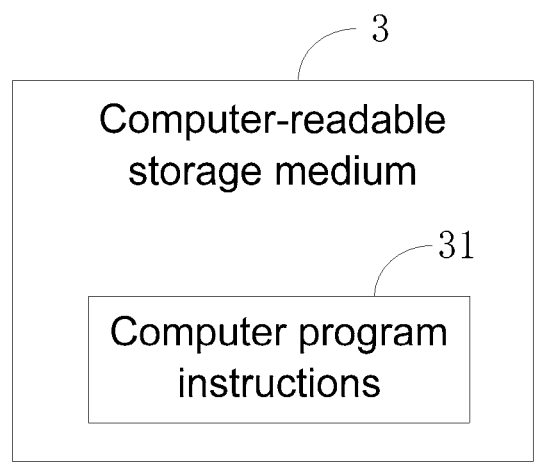
FIG. 5 is a schematic diagram of a computer-readable storage medium for implementing a method for storage management provided according to embodiments of the present disclosure.

A third aspect of the embodiments of the present disclosure further provides a non-transitory computer-readable storage medium. FIG. 5 is a schematic diagram of a non-transitory computer-readable storage medium for implementing the method for storage management provided according to embodiments of the present disclosure. As shown in FIG. 5, the non-transitory computer-readable storage medium 3 stores computer program instructions 31; and when the computer program instructions 31 are executed by a processor, the method according to any one of the embodiments above is implemented.

It should be appreciated that without conflicting with each other, all of the embodiments, features, and advantages set forth above for the method for storage management according to some embodiments of the present disclosure are equally applicable to the system for storage management and storage medium according to some embodiments of the present disclosure. That is, all of the embodiments and variations thereof described above as applied to the method for storage management may be directly applied to the system and storage medium according to some embodiments of the present disclosure, and are directly incorporated herein. For brevity of the present disclosure, description is not repeated herein.

A fourth aspect of the embodiments of the present disclosure further provides a computer device, including a memory 402 and a processor 401, and the memory stores a computer program, and when the computer program is executed by the processor, the method of any one of the embodiments above is implemented.

Figure 6:
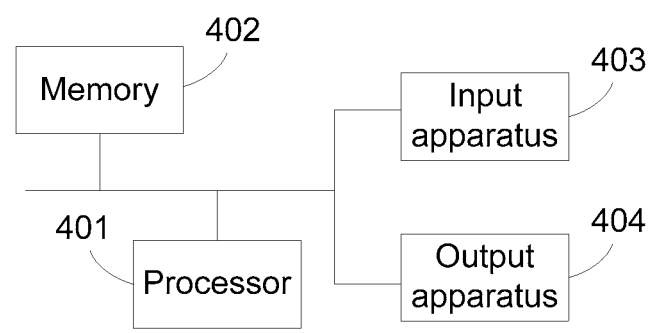
FIG. 6 is a schematic diagram of a hardware structure of a computer device for executing a method for storage management provided according to embodiments of the present disclosure.

FIG. 6 is a schematic diagram of a hardware structure of some embodiments of a computer device for executing a method for storage management provided according to embodiments of the present disclosure. Taking the computer device shown in FIG. 6 as an example, the computer device includes a processor 401 and a memory 402, and can further include an input apparatus 403 and an output apparatus 404. The processor 401, the memory 402, the input apparatus 403, and the output apparatus 404 may be connected by a bus or in another manner, and connection by the bus is used as an example in FIG. 6. The input apparatus 403 may receive inputted number or character information and generate key signal inputs related to user settings and function controls of the system for storage management. The output apparatus 404 may include a display device such as a display screen.

The memory 402, as a non-volatile non-transitory computer-readable storage medium, may be used to store a non-volatile software program, a non-volatile computer-executable program, and components, such as program instructions/components corresponding to the method for storage management in the embodiment of the present disclosure. The memory 402 may include a program storage area and a data storage area, and the program storage area may store an operating system and an application program required by at least one function; and the data storage area may store data created due to use of the method for storage management, and the like. In addition, the memory 402 may include a high-speed random access memory, and can further include a non-volatile memory, for example, at least one magnetic disk storage device, a flash memory device, or other non-volatile solid-state storage devices. In some embodiments, the memory 402 optionally includes memories remotely arranged relative to processor 401; these remote memories can be connected to a local component over a network. Examples of the network include, but are not limited to the Internet, an intranet, a local area network, a mobile communication network and a combination thereof.

By running the non-volatile software program, instructions and components which are stored in the memory 402, the processor 401 executes various functional applications of a server and executes data processing, so as to implement the method for storage management in the method embodiments above.

Finally, it should be illustrated that the non-transitory computer-readable storage medium (e.g. memory) herein may be volatile memory or non-volatile memory, or may include both volatile memory and non-volatile memory. By way of example and not limitation, the non-volatile memory may include a read-only memory (ROM), a programmable ROM (PROM), an electrically programmable ROM (EPROM), an electrically erasable programmable ROM (EEPROM), or flash memory. The volatile memory may include a random access memory (RAM), the RAM may act as an external cache memory. By way of example and not limitation, the RAM may be available in a variety of forms, such as synchronous RAM (DRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The storage device of the disclosed aspects is intended to include, but is not limited to, these and other memories of suitable types.

A person skilled in the art would further understand that various illustrative logical blocks, components, circuits, and algorithm steps described in connection with the disclosure herein may be implemented as electronic hardware, computer software, or a combination of both. To clearly illustrate the interchangeability of hardware and software, general illustration has been made regarding the functions of various illustrative assemblies, blocks, components, circuits and steps. Whether such functions are implemented as software or implemented as hardware depends upon the particular application, and design constraints imposed on the overall system. A person skilled in the art could implement functions in various ways regarding each particular application, but such implementation decisions should not be interpreted as causing a departure from the scope of the disclosure of the embodiments of the present disclosure.

The content above merely relates to exemplary embodiments of the present disclosure, but it should be noted that various changes and modifications could be made without departing from the scope disclosed in the embodiments of the present disclosure as defined in the appended claims. The functions, steps and/or actions of the method claims in accordance with the disclosed embodiments described herein need not be performed in any particular sequence. In addition, although elements disclosed in the embodiments of the present disclosure may be described or claimed in an individual form, unless explicitly limited to a singular number, it is also understood that there may be multiple elements.

It should be understood that as used herein, the singular form "a (an)" is intended to include plural forms as well, unless the context clearly supports exceptions. It should also be understood that "and/or" as used herein refers to any and all possible combinations including one or more associated items listed. The serial numbers of the embodiments disclosed in the embodiments of the present disclosure are only for description, and do not represent the preference of the embodiments.

It should be understood by a person of ordinary skill in the art that the discussion of any embodiment above is merely exemplary, and is not intended to imply that the scope (including the claims) disclosed in embodiments of the present disclosure is limited to these examples. Under the idea of the embodiments of the present disclosure, technical features in the described embodiments or in different embodiments may also be combined, and there are many other variations of different aspects of the embodiments of the present disclosure, but for simplicity, they are not provided in detail. Therefore, any omissions, modifications, equivalent replacements, improvements, etc. made within the spirit and principle of embodiments of the present disclosure shall all fall within the scope of protection of embodiments of the present disclosure.

What is claimed is:

1. A method for storage management, comprising:
making hard disks in a storage pool network with several controllers via network hard disk enclosures, respectively sending hard disk information to proxy drivers which are pre-configured in the controllers via the network hard disk enclosures, and selecting one of the controllers as a main controller;
respectively sending, by the proxy drivers, the hard disk information to cluster drivers which are pre-configured in respective controllers;
acquiring the hard disk information from the cluster drivers via the main controller so as to generate total hard disk information, and sending the total hard disk information to respective cluster drivers;
in response to receiving a request to allocate a storage space, acquiring information of a logical unit space corresponding to the request, and allocating an idle hard disk in the storage pool for the logical unit space according to the total hard disk information; and
in response to initiating a read/write request on a basis of the logical unit space, processing, by corresponding controllers, the read/write request in parallel in the idle hard disk on a basis of the total hard disk information.

2. The method according to claim 1, wherein respectively sending the hard disk information to the proxy drivers which are pre-configured in the controllers via the network hard disk enclosures comprises:
respectively sending, by the network hard disk enclosures, physical information of the hard disks and path information of connection between the hard disks and the controllers to the proxy drivers which are pre-configured in the controllers.

3. The method according to claim 2, wherein acquiring the hard disk information from the cluster drivers via the main controller so as to generate the total hard disk information, and sending the total hard disk information to the respective cluster drivers comprises:
  aggregating, by the cluster driver of the main controller, the path information respectively received by other cluster drivers; and
  respectively sending aggregated total path information to the other cluster drivers, so that each of the cluster drivers has the total hard disk information constituted by the total path information and the physical information.

4. The method according to claim 1, wherein selecting one of the controllers as the main controller comprises:
  respectively allocating a vector regarding respective IP address and ID number to each of the controllers, and selecting the controller with a smallest ID number as the main controller.

5. The method according to claim 1, wherein in response to receiving the request to allocate the storage space, acquiring the information of the logical unit space corresponding to the request, and allocating the idle hard disk in the storage pool for the logical unit space according to the total hard disk information comprises:
  in response to receiving the request to allocate the storage space, acquiring the information of the logical unit space corresponding to the request, and informing other cluster drivers of the information of the logical unit space by the cluster driver of the main controller; and
  on a basis of the logical unit space, requesting the storage pool to allocate a space, and querying the idle hard disk in the storage pool on a basis of physical information in the total hard disk information and allocating the idle hard disk to the logical unit space.

6. The method according to claim 5, further comprising:
  establishing a mapping table of correlation between stripe blocks of the hard disks and the controllers.

7. The method according to claim 6, wherein in response to initiating the read/write request on the basis of the logical unit space, processing, by the corresponding controllers, the read/write request in parallel in the idle hard disk on the basis of the total hard disk information comprises:
  in response to initiating the read/write request on the basis of the logical unit space, slicing, by the main controller, a part of the logical unit space corresponding to the read/write request into several logical blocks in units of stripe blocks;
  sequentially corresponding the several logical blocks to the stripe blocks having a preset sequence in the idle hard disk, and finding several corresponding controllers from the mapping table on a basis of corresponding stripe blocks; and
  processing the read/write request in parallel by the corresponding several controllers in the corresponding stripe blocks.

8. A computer-readable storage medium, storing computer program instructions, wherein when the computer program instructions are executed by a processor, the computer program instructions are configured to cause the processor to:
  make hard disks in a storage pool network with several controllers via network hard disk enclosures, respectively send hard disk information to proxy drivers which are pre-configured in the controllers via the network hard disk enclosures, and select one of the controllers as a main controller;
  respectively send, by the proxy drivers, the hard disk information to cluster drivers which are pre-configured in respective controllers;
  acquire the hard disk information from the cluster drivers via the main controller so as to generate total hard disk information, and send the total hard disk information to respective cluster drivers;
  in response to receiving a request to allocate a storage space, acquire information of a logical unit space corresponding to the request, and allocate an idle hard disk in the storage pool for the logical unit space according to the total hard disk information; and
  in response to initiating a read/write request on a basis of the logical unit space, process, by corresponding controllers, the read/write request in parallel in the idle hard disk on a basis of the total hard disk information.

9. A computer device, comprising a memory and a processor, wherein the memory stores a computer program, and when the computer program is executed by the processor, cause the processor to:
  make hard disks in a storage pool network with several controllers via network hard disk enclosures, respectively send hard disk information to proxy drivers which are pre-configured in the controllers via the network hard disk enclosures, and select one of the controllers as a main controller;
  respectively send, by the proxy drivers, the hard disk information to cluster drivers which are pre-configured in respective controllers;
  acquire the hard disk information from the cluster drivers via the main controller so as to generate total hard disk information, and send the total hard disk information to respective cluster drivers;
  in response to receiving a request to allocate a storage space, acquire information of a logical unit space corresponding to the request, and allocate an idle hard disk in the storage pool for the logical unit space according to the total hard disk information; and
  in response to initiating a read/write request on a basis of the logical unit space, process, by corresponding controllers, the read/write request in parallel in the idle hard disk on a basis of the total hard disk information.

10. The method according to claim 1, wherein the hard disks are located in the network hard disk enclosures and are connected to the network hard disk enclosures; the network hard disk enclosures use network interfaces, and the controllers and the network hard disk enclosures are connected via a network and interacts with each other by an NVME over TCP/RDMA protocol.

11. The method according to claim 1, wherein the proxy drivers communicate with the hard disks in the network hard disk enclosures by an nvme of protocol.

12. The method according to claim 2, wherein the physical information of the hard disk comprises a serial number, a manufacturer, a firmware version, and hard disk capacity of the hard disk.

13. The method according to claim 2, the path information comprises an IP address of the controller connected to the hard disk, and an IP address of the network hard disk enclosure connected to the hard disk.

14. The method according to claim 1, wherein acquiring the hard disk information from the cluster drivers via the main controller so as to generate the total hard disk information, and sending the total hard disk information to the respective cluster drivers comprises:

sending, by the cluster drivers of other controllers, respective path information to the cluster driver of the main controller;

aggregating, by the cluster driver of the main controller, information of its own path information and the path information of the other controllers; and sending, by the cluster driver of the main controller, aggregated total path information to the cluster drivers of the other controllers; and at this time, each of the controllers has the total path information and the physical information, and the total path information and the physical information together form the total hard disk information.

15. The method according to claim 14, wherein the method further comprise:

when there is a controller of which the path information changes, updating, by the cluster driver of the controller, the path information;

sending, by the cluster driver of the controller, updated path information to the cluster driver of the main controller;

updating, by the cluster driver of the main controller, the total path information; and sending, by the cluster driver of the main controller, updated total path information to the cluster drivers of the other controllers.

16. The method according to claim 1, wherein selecting one of the controllers as the main controller comprises:

respectively allocating a vector regarding respective IP address and ID number to each of the controllers, and selecting the controller with a greatest ID number among the controllers as the main controller.

17. The method according to claim 1, wherein the storage pool is a storage space constituted by several hard disks; the hard disks constituting the storage pool are on one network hard disk enclosure, or the hard disks constituting the storage pool are distributed in different network hard disk enclosures.

18. The method according to claim 1, wherein in response to receiving the request to allocate the storage space, acquiring the information of the logical unit space corresponding to the request, and allocating the idle hard disk in the storage pool for the logical unit space according to the total hard disk information comprises:

when receiving the request to allocate the storage space, creating the logical unit space, and notifying, by the cluster driver of the main controller, other cluster drivers of a message of the logical unit space;

finding an idle hard disk from the storage pool according to size of the logical unit space, wherein the physical information of the hard disks is updated when capacity of the hard disks changes, so that the cluster driver know which hard disks are idle according to the physical information of the hard disks; and allocating the idle hard disk to the logical unit space according to sequence of the hard disks.

19. The method according to claim 6, wherein establishing the mapping table of correlation between the stripe blocks of the hard disks and the controllers comprises:

slicing each of the hard disks into a plurality of the stripe blocks, each of the hard disks is sliced into units, and each of the plurality of the stripe blocks are distributed on different stripes, and each of the stripes is formed by combining stripe blocks of a plurality of the hard disks;

making the stripes correspond to different controllers in advance to form the mapping table.

20. The method according to claim 1, wherein the logical unit space is allocated in sequence in the storage pool according to the idle hard disk.

* * * * *